Dec. 23, 1952 — E. F. KROHN — 2,622,328
HOLDER AND FORM DUPLICATOR FOR FLAME CUTTING HAND TORCHES
Filed March 7, 1949 — 6 Sheets-Sheet 1

Inventor
Emil F. Krohn

Dec. 23, 1952

E. F. KROHN 2,622,328

HOLDER AND FORM DUPLICATOR FOR
FLAME CUTTING HAND TORCHES

Filed March 7, 1949

Inventor

Emil F. Krohn

By Clarence A. O'Brien
and Harvey B. Jacobson
Attorneys

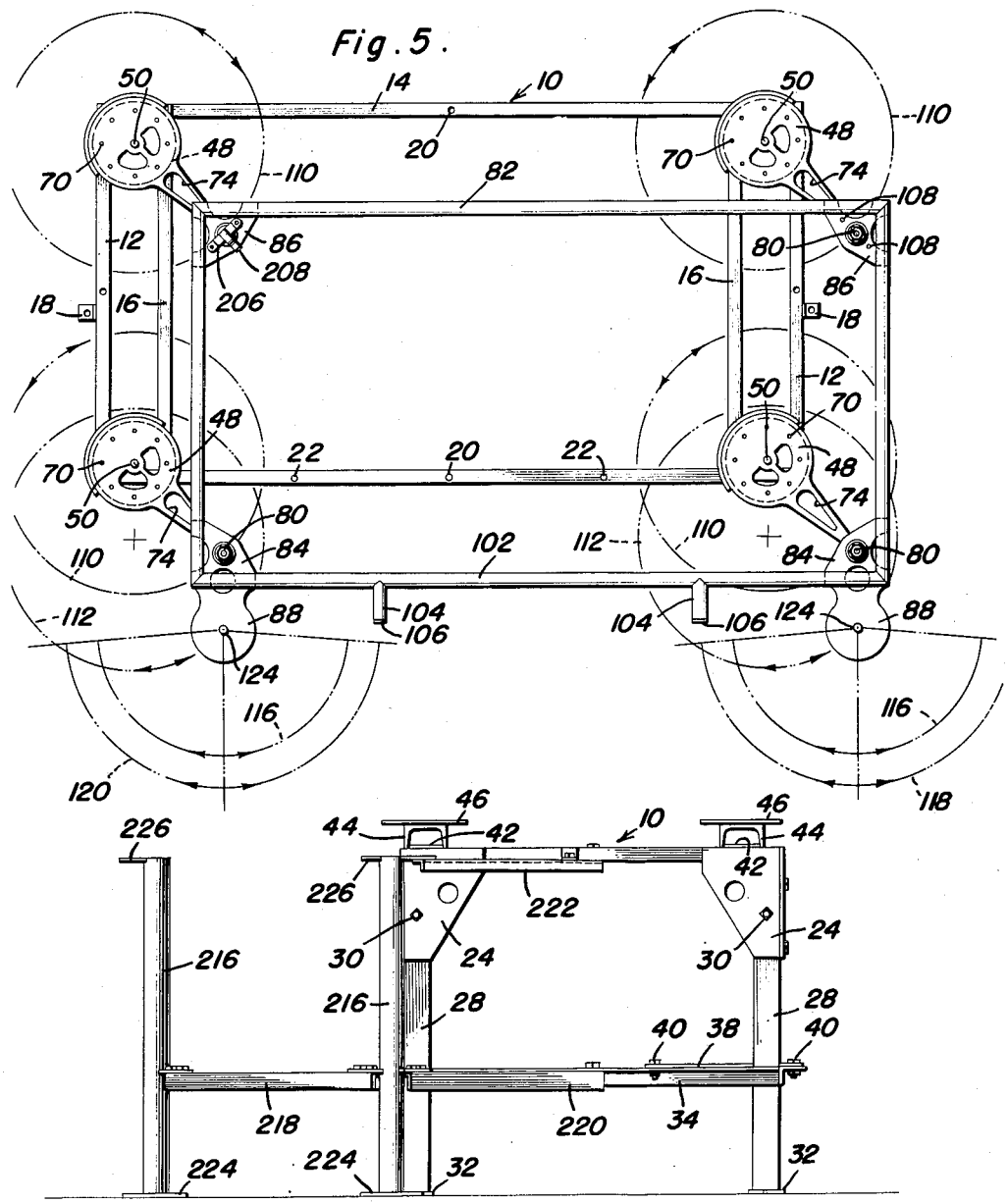

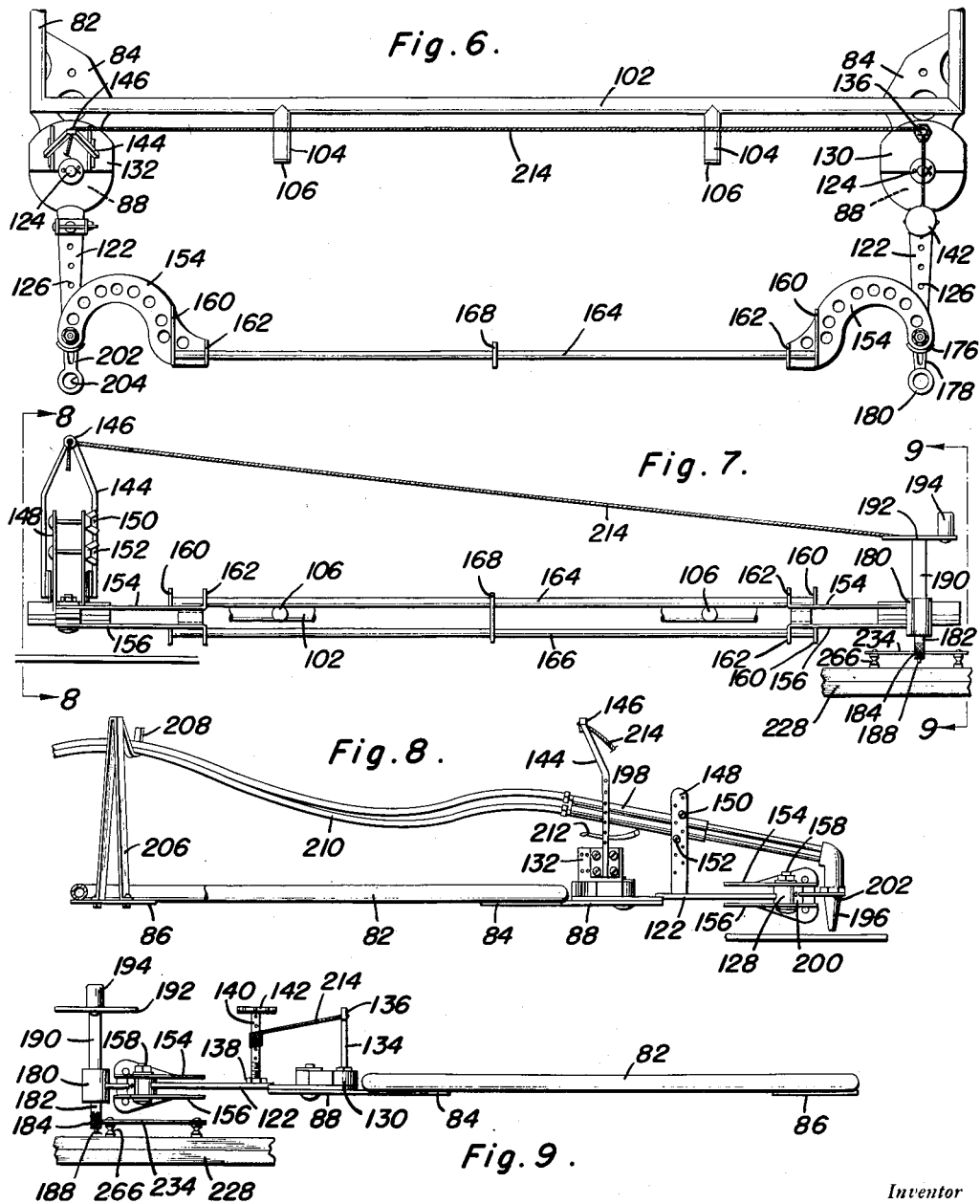

Dec. 23, 1952 — E. F. KROHN — 2,622,328
HOLDER AND FORM DUPLICATOR FOR FLAME CUTTING HAND TORCHES
Filed March 7, 1949 — 6 Sheets-Sheet 5
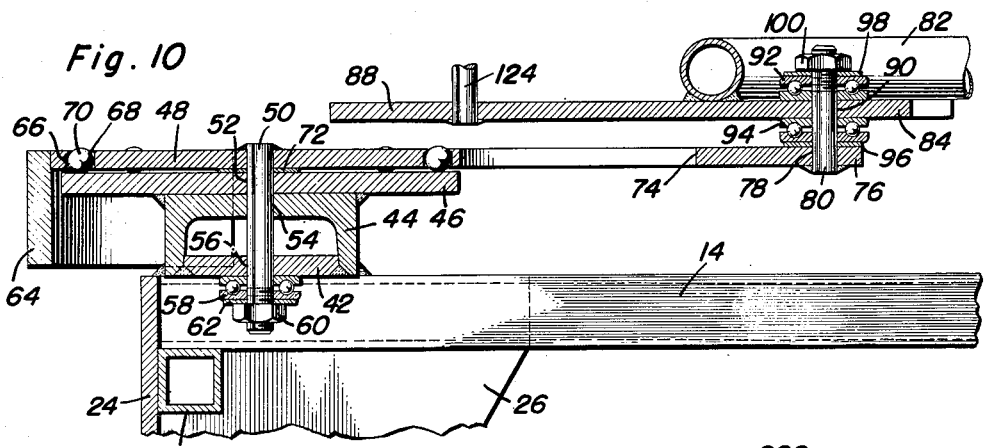
Fig. 10
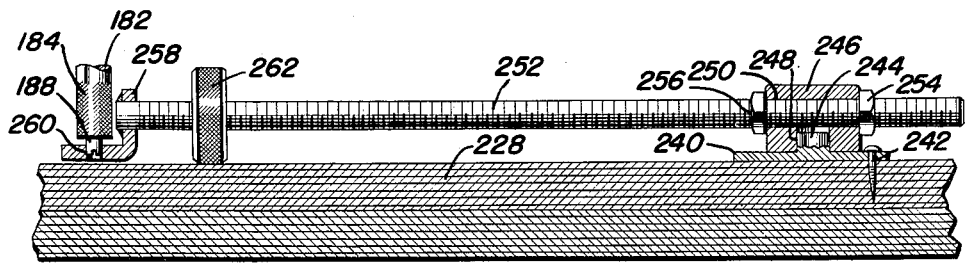
Fig. 11.
Fig. 12.
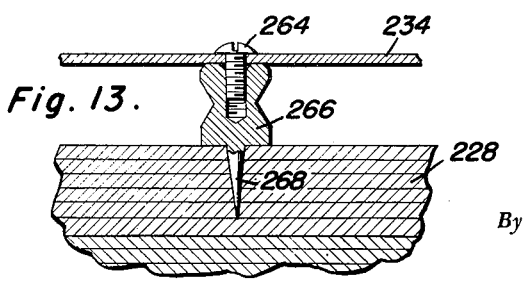
Fig. 13.
Inventor
Emil F. Krohn
By Clarence A. O'Brien
and Harvey B. Jacobson
Attorneys Dec. 23, 1952
E. F. KROHN
2,622,328
HOLDER AND FORM DUPLICATOR FOR
FLAME CUTTING HAND TORCHES
Filed March 7, 1949
6 Sheets-Sheet 6
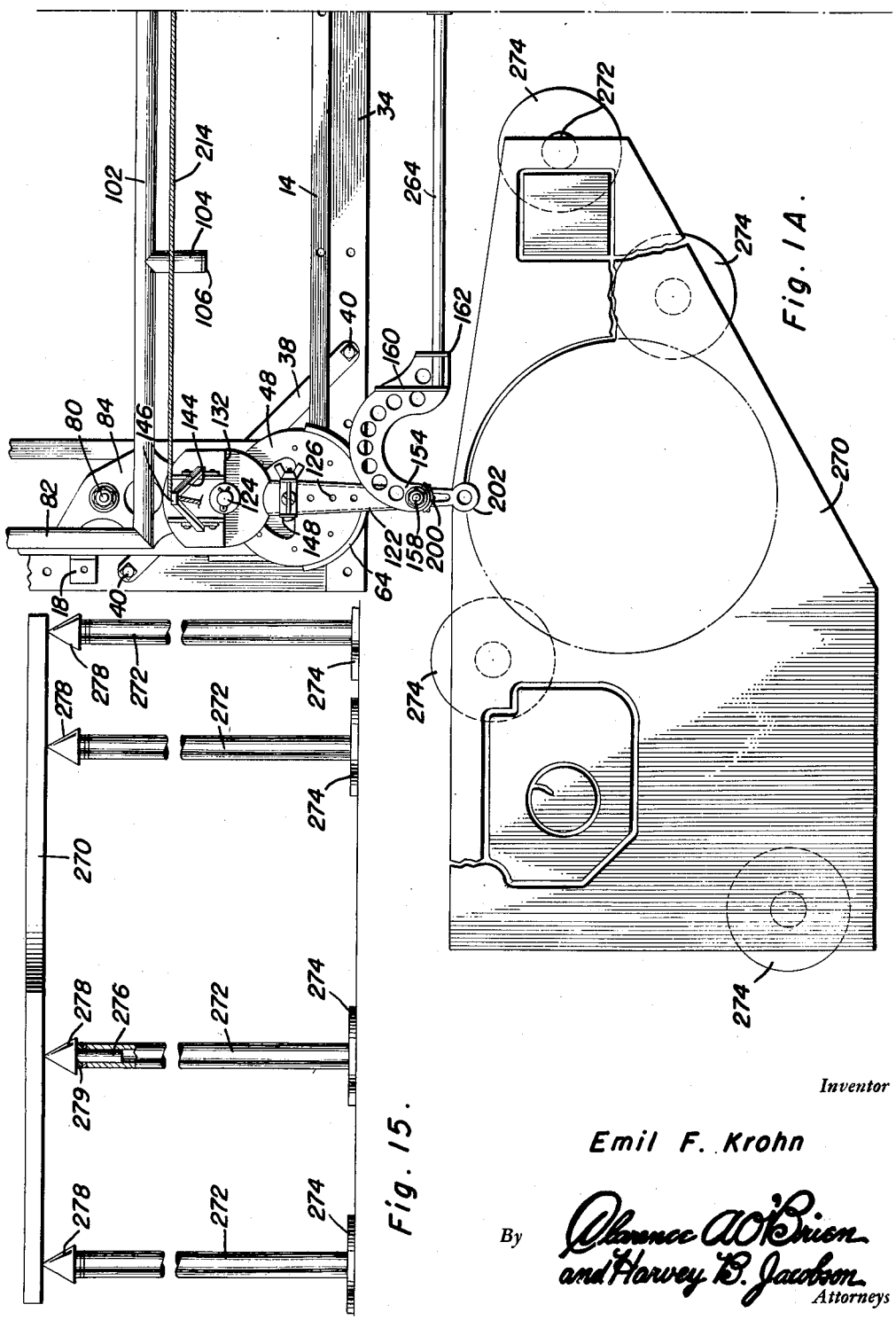
Inventor
Emil F. Krohn
By *Clarence A. O'Brien and Harvey B. Jacobson*
Attorneys Patented Dec. 23, 1952

2,622,328

UNITED STATES PATENT OFFICE 2,622,328

HOLDER AND FORM DUPLICATOR FOR FLAME CUTTING HAND TORCHES

Emil F. Krohn, Centerville, Mich.

Application March 7, 1949, Serial No. 79,962

4 Claims. (Cl. 33—25)

This invention relates to new and useful improvements in pantographs and the primary object of the present invention is to provide a holder and form duplicator for flame cutting hand torches.

Yet another important object of the present invention is to provide very light metal templates of any size, shape or contour that are cut from metallic blanks by tin snips or such other manually actuated cutting tools.

Another important object of the present invention is to provide a machine for accurately and economically cutting sections of various shapes, such as circular, elliptical, rectangular, octagonal, polygonal, trapezoidal, triangular, square or the like, from metallic sheets.

Yet, another object of the present invention is to provide a pantograph that is so constructed as to permit the same to be quickly and readily operated by skilled or unskilled labor in a convenient and safe manner.

Another feature of the present invention is to provide a torch cutting apparatus including a torch holder, a template and novel and improved template following means which are manually operated to trace a desired pattern and thereby cut a pattern in a sheet of metal by a torch mounted on the holder.

Another feature of the present invention is to provide a holder and form duplicator for flame cutting hand torches including a torch holding mechanism constructed for use with various types of torches.

Another feature of the present invention is to provide a torch cutting apparatus including a movable torch supporting frame and a novel and improved template following mechanism that is readily adjustable for cutting circular patterns of various diameters, from sheet metal.

Another feature of the present invention is to provide a manually operated metal-working machine including a fixed, main frame, a movable frame, and embodying novel and improved mounting means for attaching the movable frame to the fixed frame.

Another feature of the present invention is to provide a pantograph including a template follower having a knurled surfaced tracer arm so constructed as to permit the same to grip the edges of a template for reducing to a minimum the rounded corners of a multi-sided figure cut in a sheet of metal by a torch held on the pantograph.

A further object of the present invention is to provide a holder and form duplicator for flame cutting hand torches that is so constructed as to facilitate the same to be quickly and readily converted to use for either a right-handed or left-handed operator.

Yet, another very important object of the present invention is to provide a pantograph that is extremely small and compact in structure and which is manually operated to reduce the number of working parts and the added expense of having motor means for automatically operating the same.

A still further aim of the present invention is to provide a metal-working machine of the aforementioned character that is simple and practical in construction, strong and reliable in use, efficient and durable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figures 1 and 1A are enlarged fragmentary top plan views of the present invention in position for use with the template and template follower illustrated in Figure 1 and the work piece and torch shown in Figure 1A;

Figure 4 is an end view taken substantially in the plane of section lines 4—4 of Figure 3;

Figure 5 is a detailed sectional view of the rotating frame assembly applied to the main frame, the eccentric cranks shown 135° clockwise from their position in Figures 1 and 1A, and with dotted lines showing the paths of movement for various elements of the rotating frame;

Figure 6 is a fragmentary top plan view of the rotatable frame assembly, the torch guide and template follower support applied thereto, the template follower and torch being removed for clarity in description;

Figure 7 is a front elevational view of Figure 6 and showing the template follower applied to its support and positioned with respect to a template;

Figure 8 is an end view taken substantially on the plane of section line 8—8 of Figure 7, and showing a torch applied thereto and in position to its work piece.

Figure 9 is an end view taken substantially on the plane of section line 9—9 of Figure 7;

Figure 10 is an enlarged, fragmentary view, partly in elevation and partly in section, showing the manner in which the swingable frame is attached to the main frame;

Figure 11 is an enlarged fragmentary top plan view illustrating the radius arm used in conjunction with the present invention;

Figure 12 is an enlarged vertical sectional view taken substantially on the plane of section line 12—12 of Figure 1;

Figure 13 is an enlarged vertical sectional view taken substantially on the plane of section line 13—13 of Figure 1;

Figure 14 is an enlarged vertical sectional view showing the template following member used in conjunction with the present invention; and, Figure 15 is an enlarged front elevational view showing the manner in which the work piece is held in position for cutting, and with parts of the supports broken away for the convenience of explanation.

Figure 1:
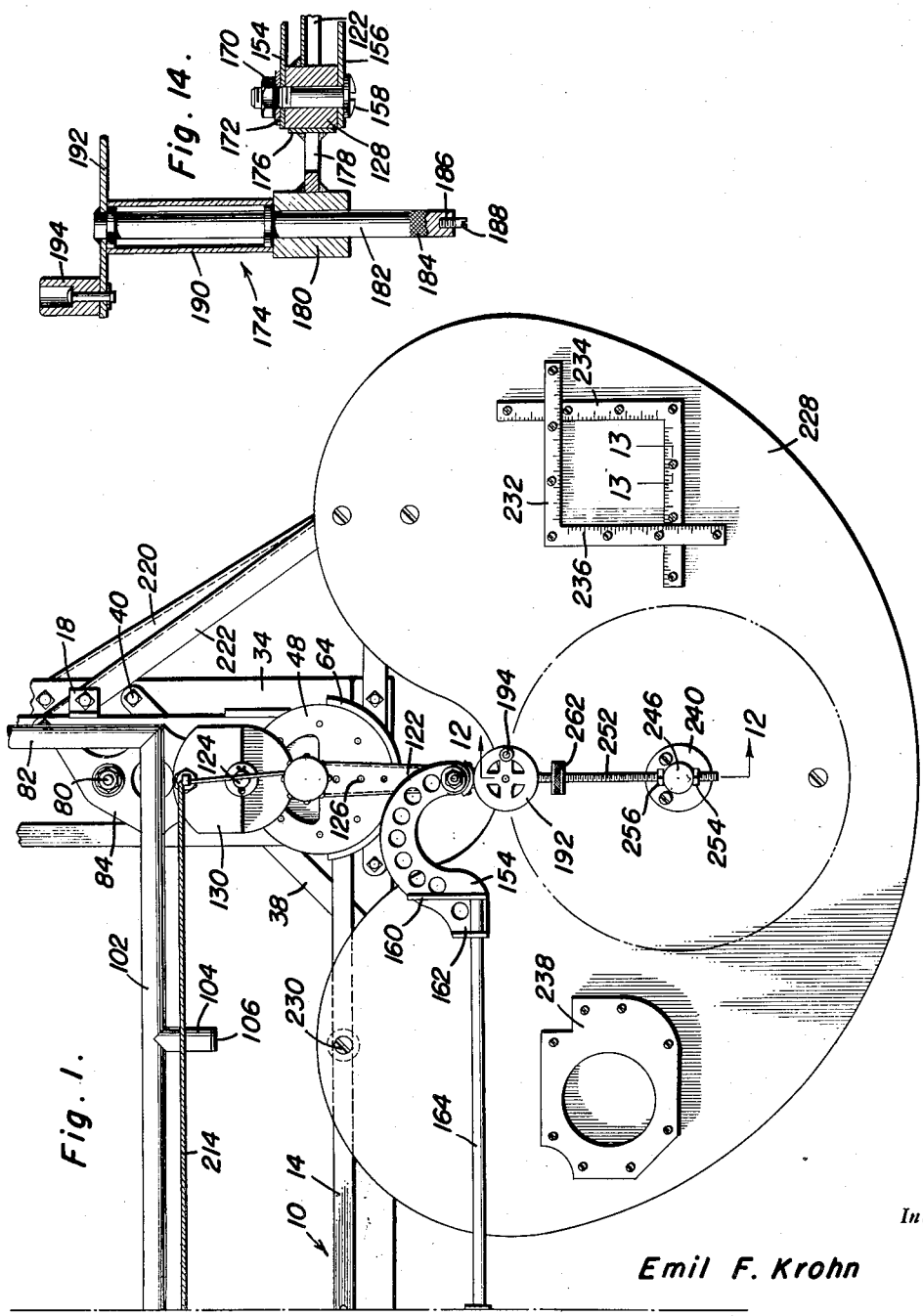
Figure 2:
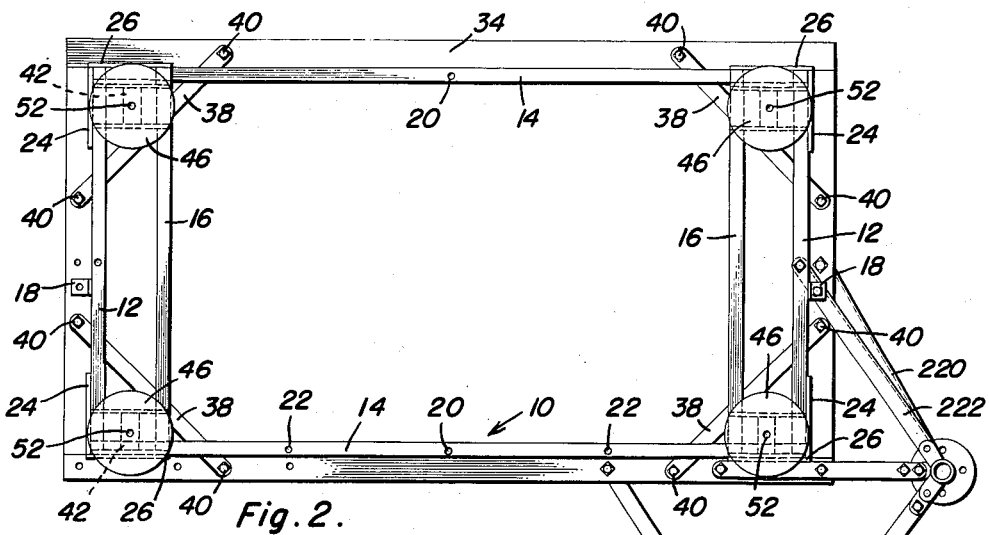
Figure 2 is a top plan view of the main frame or table, per se, and showing the template support applied thereto.
Figure 3:
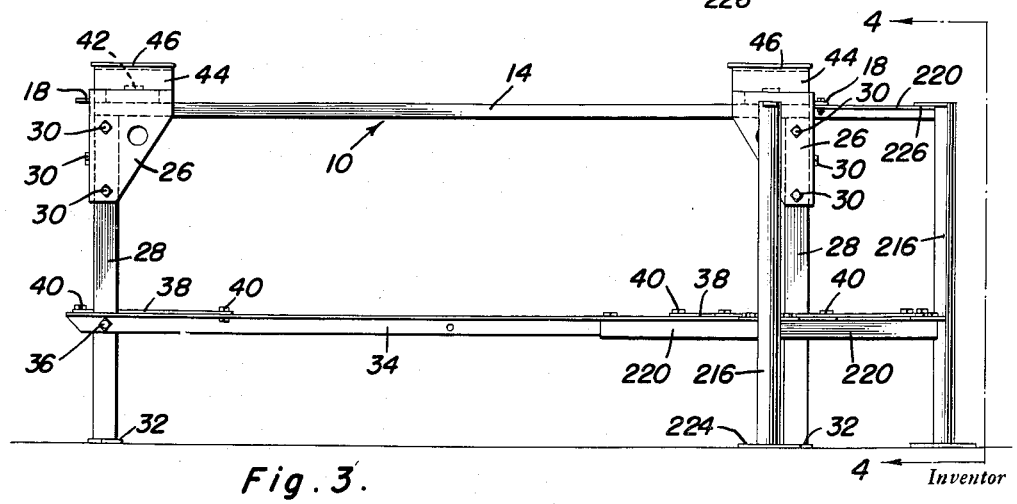
Figure 3 is a front elevational view of Figure 2.

Referring now to the drawings in detail and more particularly to Figures 2, 3, 4, 5, and 10, wherein for the purpose of illustration, there is disclosed a preferred embodiment of the main or fixed frame that is used in conjunction with the present invention.

The numeral 10 represents a substantially rectangular and open frame of preferably square or box iron construction and including end members 12 and side member 14. Extending transversely between the side members 14 and disposed adjacent and parallel to the end members 12, is a pair of square tubes or members or box iron reinforcing straps 16 having their terminals fixed to the side members 14 by welding or the like.

Rigidly secured to the end members 12, intermediate the ends thereof, are angle iron clips 18 for a purpose which will later be more fully described.

The side members 14 are formed, at their centers, with openings 20 which serve as connecting bolt holes when stiffener angles (not shown) are used to reinforce the main frame 10.

One of the side members 14 is provided with a further pair of openings or apertures 22 that receive suitable bolts for attaching a form table top or plate (later to be described), relative to the frame 10 and at the right or left end thereof depending upon which of the openings 22 is utilized.

Gusset plates 24 are fixed to and depend from the ends of the end members 12, and further gusset plates 26 are fixed to and depend from the ends of the side members 14. An angle iron leg or support 28 is associated with each pair of gusset plates 24 and 26, at the corners of the frame 10, and these legs are detachably secured to the gusset plates by bolts and nuts 30 or such other suitable fasteners.

The lower ends of legs 28 are welded to bearing feet or plates 32 having suitable apertures for receiving fasteners whereby the main frame may be removably secured to a supporting structural element such as a floor.

The four legs 28 supporting the frame 10 is an elevated and substantially horizontal position are embraced by a further substantially rectangular brace frame 34 of preferably angle iron construction. The frame 34 being detachably secured to the legs 28 through the medium of bolts and nuts 36, as well as lock washers.

Diagonal corner braces 38 extend between the ends of sides of the frame 34 and are terminally secured to the frame 34 by bolts and nuts 40 to hold the frame 34 in its substantially rectangular shape.

Rectangular anchor plates 42 are rigidly secured to longitudinally extending, inverted, channel members 44, which in turn are welded or otherwise rigidly secured to the ends of the tube members 12 and 16.

Circular plates 46 are tack welded to the webs of the channel members 44 and will be referred to as swing arms, bottom washers or ball bearings race seats.

Directional swinging arms

Attention is now directed to Figure 10 wherein there is illustrated the manner for attaching the rotating arms or directional swinging arms 48 to the main frame 10.

The arms 48 include enlarged substantially circular end portions that are centrally apertured to receive headless bolts 50. The bolts 50 are tack welded to the outer faces of the arms 48 and extend downwardly through vertically aligned openings 52, 54 and 56 provided in the plates 46, channels 44 and anchor plates 42.

Suitable encased, slow action, thrust bearings 58 are received on the lower ends of the bolts 50 and are held against the anchor plates 42 by jamb nuts 60 threaded on the lower ends of said bolts 50. Washers 62 embracing the bolts 50 are interposed between the bearings 58 and nuts 60.

In order to add weight to the enlarged end portions of the arms 48, arcuate aprons 64 are welded to the outer arcuate edges of the enlarged end portions and loosely embrace the channels 44.

A plurality (preferably eight), of circumferentially spaced recesses or holes 66 are drilled in the enlarged end portions of the arms 48, from their undersurfaces, part way up through the top sides, as to allow the arm material to remain above, such as flanges 68, which function as a means for retaining ball bearings 70 within the seats or holes 66 with a portion of each ball bearing 70 projecting below the lower surfaces of the arms 48.

The ball bearings 70 ride upon the upper surfaces of the plates 46 and washers 72 received on the bolts 50 are disposed between the arms 48 and the plates 46.

The arms 48 are provided with any suitable number of slots, openings or cut-outs 74 that will reduce the weight of the arms and the reduced, free ends 76 of the arms 48 are provided with openings 78 that receive the lower headless ends of upstanding bolts 80. It should be noted that the bolts 80 are welded to the undersurface of the arms 48.

Movable frame

Reference is now directed to Figures 5 and 10 wherein there is disclosed the movable frame 82 and the manner employed for securing the same to the rotating arms 48.

The movable frame 82 is preferably rectangular in configuration and consists of a plurality of elongated tubular members which are terminally welded together. The corners of the movable frame 82 are reinforced by forward and rear pairs of gusset plates 84 and 86 and the forward gusset plates 84 are provided with extensions 88 that are disposed laterally of the movable frame and at the forward ends thereof.

The gusset plates 84 and 86 are provided with openings 90, spaced inwardly of the corners of the movable frame 82, and these openings 90 receive the bolts 80.

Upper and lower thrust bearings 92 and 94 are received on the bolts 80 and are disposed above and below the gusset plates 84 and 86. Washers 96 are disposed on the bolts 80 and between the bearings 94 and end portions 76 of arms 48, and further washers 98 are mounted on the bolts 80 and are disposed between the bearings 92 and nuts 100 threaded on the upper ends of the bolts 80.

Fixed to and projecting laterally from the forward longitudinal member 102 of the movable frame 82, is a pair of spaced parallel short tubes or stops 104 having flat outer ends to which there is welded transmission rod bumpers or stops 106.

Each of the rear gusset plates 86 are provided with a pair of spaced openings 108 so that a hose holder (later to be described) may be bolted to a selected one of the rear gusset plates, depending on whether the instant structure is to be used by a left or right handed operator.

In Figure 5, the dotted line circles 110 indicate the paths followed by the bolts 80, the dotted line circles 112 the paths followed by the fastener 124 in the extensions 88, the dotted line arcs (approximately 170°) 116 the paths followed by the bolts 158, and the dotted line arcs (approximately 170°) 118 and 120 the paths followed by both the template follower (later described) and the torch tip (later described) in either direction.

Connecting means between forward gusset extensions

Means is provided for joining the extensions 88 of the forward gusset plates 84 and this means comprises transmission arm members 122 that are secured to the extensions 88 by fasteners 124. The arm members 122 are provided with spaced openings 126 and the free outer ends of the arm members 122 are fixed to vertically disposed sleeves or bosses 128.

The arm member at one end of the movable frame includes a rear portion or flat plates 130 and the remaining arm member includes a rear portion 132 or metal flats welded to the rear portion 132. The rear portion 130 supports an upstanding rod 134 having an upper eye terminal 136.

The arm member 122 associated with the portion 130 is provided with an internally threaded recess or socket 138 that receivably engages a perforated stud 140 having a hand grip 142.

Detachably secured to the portion 132, is a substantially U-shaped support 144 having an eye portion 146. The arm member 122 associated with the portion 132 holds a U-shaped clamp 148 the legs of which are connected by upper and lower bolts and nuts 150 and 152, it being understood that the clamp 148 is secured to the arm member by a bolt and nut retained in a selected one of the openings provided in its associated arm member.

Upper and lower, arcuate and perforated plates 154 and 156 are attached to each of the arm members 122 by bolts 158 passing through the sleeves and selected openings in the plates 154 and 156. The plates 154 and 156 are provided with substantially vertical webs 160 and 162 that are apertured to receive the terminals of upper and lower connecting rods 164 and 166. The rods 164 and 166 are further joined, intermediate their ends, by a suitable bracket or clip 168.

The bolts 158 receive nuts 170 and washers 172 carried by the bolts 158 are interposed between the nuts 170 and the upper plates 154.

Template follower

In order to retain the present template follower 174 relative to one of the sleeves 128 (see Figure 14), there is provided an arcuate plate 176 that is removably secured to one of said sleeves 128. This plate 176 is provided with a laterally projecting arm or spacer 178 that supports a vertically disposed bearing 180.

Journaled for rotation in the bearing 180 is a vertical template following rod 182 having its lower end externally knurled, as at 184. The lower end of the rod 182 is provided with an internally threaded recess 186 that receivably engages a fastener 188.

A slotted disk 192 having an eccentrically disposed finger grip 194 is fixed to the upper end of the rod 182 and a tubular hand grip 190 embraces the rod 182 and is disposed between the disk 192 and the bearing 180. It is noted that the grip 190 is rotatable on or about the rod 182.

Torch tip holder

Means is provided for holding the tip 196 of a torch 198 relative to the movable frame and this means comprises an arcuate plate 200 that is removably secured to the remaining of the sleeves 128. This latest plate 200, like plate 176, supports an arm 202 having an opening 204 in which the torch tip 196 is seated (see Figures 6 and 8).

Detachably secured to one of the rear gusset plates 86, is an upstanding bracket 206 having a laterally projecting hook or loop 208 that receives the flexible delivery tubes 210 of the torch 198, and since the torch is illustrated as being disposed on the left side of the present construction the bracket 206 is applied to the left rear gusset plate 86. By re-arranging the template follower, the position of the torch and its supporting means, it is apparent that the instant structure is capable of use by either a right handed or left handed operator, or position.

It should be noted, that the torch 198 is provided with a valve trip lever 212 to which there is applied an operating cord 214 that is slidably received by the eyes 146 and 136 and which is tied to and wound about the stud 140.

Template or form holder

Means is provided for holding templates of forms relative to the main frame 10, and this means comprises a plurality of posts or legs 216 that are connected by links 218. Their legs 216 are secured to the brace frame 34 by links or straps 220 and to the angle iron clip 18 and frame 10 by a brace member or strap 222.

The lower ends of the legs 216 are provided with apertured anchoring plates 224 and the upper ends of the legs 216 are provided laterally projecting lugs 226 for attachment to a template holding plate or table 228. The plate 228 is also secured to the frame 10 to hold the plate 228 against movement relative to the main frame 10, and through the use of a fastener 230 that engages one of the openings 22.

A pair of juxtaposed, oppositely placed angle rules 232 and 234 are removably secured to the plate 228 and have their inner edges graduated, as at 236 so that squares or rectangles of predetermined areas may be defined by a relative positioning of the members 232 and 234.

A further template such as 238 is also removably secured to the plate 228 and is of any suitable shape or size.

*Radius rod*

Attention is next directed to Figures 1, 11 and 12, wherein there is disclosed a means associated with the follower rod for use of the follower in making circles. This means includes an anchor plate 240 that is secured to the plate 228 by fasteners 242. The plate 240 includes an upstanding lug 244 and a collar 246 having a recess 248 receiving the lug 244 and is rotatable on the lug 244.

The collar 246 is formed with a diametrically disposed opening 250 that receives a threaded radius arm 252. A pair of lock nuts 254 and 256 receivably engaged on the arm 252 abut the collar 246 and retain the arm 252 longitudinally adjusted relative to the collar for rotation about the lug 244 as a pivot.

An angle member 258 is fixed to one end of the arm 252 and includes an opening 260 for receiving the fastener 188 carried by the rod 182. A knurled surface nut 262 receivably engaging the rod or arm 252 bears upon the plate 228 and holds the arm 252 substantially horizontal, and also affording it traction.

By use of the above described radius arm 252 circles of various diameters may be traced by the follower rod and followed by the torch tip.

As best shown in Figure 13, the angle members 232 and 234 are detachably secured by fasteners 264 to spacer blocks or lugs 266 having outwardly projecting pointed elements 268 that are driven into the plate 228, such an arrangement will permit adjustment of the plates 232 and 234 relative to each other. The lugs 266 are provided with continuous V-shaped grooves for receiving a claw hammer to permit removal of the said lugs.

*Work support*

In order to support a work piece or metal sheet 270 relative to the frame 10, there is provided a plurality of hollow uprights 272 having bearing feet 274. The upper ends of the uprights are open and receive the shank portions 276 of conical elements 278 that support the sheet 270. Height adjusting washers 279 are carried by the shank portions 276 and bear upon the upper ends of the uprights.

In practical use of the present invention for cutting circles in the metal sheet 270, the rod or arm 252 is adjusted relative to the collar 246, by the nuts 254 and 256, so that the rod 182 is disposed at a predetermined distance from the lug 244.

As the rod 252 is swung manually at the above described radius, the torch will follow the same circle made by the rod 252.

When patterns other than circles are to be cut by the torch, the rod 182 follows the template mounted on the table 228 and the torch tip will also follow the movement made by the rod 252.

In order to insert, remove or replace the ball bearings 70, any suitable wedge or tool is inserted between the arms 48 and the plates 46 which will space the arms 48 from the plates 46 to permit access to the ball bearings.

Obviously, any suitable torch could be applied to the movable frame and clamped between the legs of the clamp 148 and the upper and lower bolts 150 and 152, although it is preferred that the torch be provided with a control valve trip lever 212 so that the flame emitted from the torch tip can be regulated and controlled by turning the hand grip 142 which will pull or release the lever 212 through the cord or flexible element 214.

A novel feature of the present invention resides in the fact that most of the major parts are quickly formed by the use of the instant apparatus, thereby permitting repair and replacement of parts at a very economical cost.

It should be noted, that the present invention is adapted for use with scrap metal, however, when such replaces the sheet metal 270 the uprights 272 are detachably secured to a holding plate that supports a plurality of relative close conical elements, such as 278, having shank portions that are received in apertures formed in the said holding plate.

Having described the invention, what is claimed as new is:

1. A holder and form duplicator for flame cutting hand torches comprising first and second similarly shaped rigid frames each having a plurality of corners, said frames being juxtapositioned with each corner of the first frame located adjacent a corner of the second frame, a plurality of arms terminally pivoted to the adjacent corners of the frames to permit rotation of the frames relative to each other, a pair of arm members pivoted to a pair of corners of said first frame, means carried by one of said arm members for supporting a torch, means carried by the other arm member for supporting a follower, and a member connecting said arm members.

2. The combination of claim 1 and means securing each of said arms to said first frame, said securing means including corner members secured to each corner of the first frame each having a bearing plate, laterally projecting pivot pins fixed to said arms and extending through said corner members, said arms overlying said plates, anti-friction means between said plates and said arms, nuts threaded on said pins and bearings on said pins and retained against said corner members by said nuts.

3. The combination of claim 1 wherein said connecting member comprises upper and lower pairs of arcuate and perforated plates, one pair of said plates being pivoted to said one of said arm members and the other pair of said plates being pivoted to said other of said arm members, vertical webs on each of said plates and having apertures, and a pair of parallel rods having their end received in said apertures to connect said pairs of plates.

4. The combination of claim 1 and gusset plates fixed to and reinforcing and strengthening the corners of the second frame, and pivots extending through the gusset plates and pivotally attaching said arms to the second frame.

EMIL F. KROHN.

(References on following page)

REFERENCES CITED

The following references are of record in the file of this patent:

UNITED STATES PATENTS

| Number | Name | Date |
|---|---|---|
| 256,462 | Clark | Apr. 18, 1882 |
| 1,104,289 | Bucknam | July 21, 1914 |
| 1,220,548 | Plancq | Mar. 17, 1917 |
| 1,324,007 | Bucknam | Dec. 2, 1919 |
| 1,352,760 | Plumley | Sept. 14, 1920 |
| 1,555,992 | Krebs | Oct. 6, 1925 |
| 1,617,312 | Braren | Feb. 8, 1927 |
| 1,755,967 | Pagani | Apr. 22, 1930 |
| 1,763,793 | Krebs | June 17, 1930 |
| 1,829,551 | Wambsgans | Oct. 27, 1931 |
| 1,861,758 | Shippy | June 7, 1932 |
| 1,977,710 | Anderson | Oct. 23, 1934 |
| 2,025,842 | Africano | Dec. 31, 1935 |
| 2,035,544 | Goodwillie | Mar. 21, 1936 |
| 2,038,820 | Anderson | Apr. 28, 1936 |
| 2,284,005 | McKiernan | May 26, 1942 |
| 2,286,664 | Anderson | June 16, 1942 |
| 2,305,909 | Stoneberg | Dec. 22, 1942 |
| 2,363,036 | Anderson | Nov. 21, 1944 |
| 2,429,686 | Helmkamp | Oct. 18, 1947 |
| 2,469,844 | Porter et al. | May 10, 1949 |
| 2,488,898 | Brasty | Nov. 22, 1949 |
| 2,524,731 | Mattei | Oct. 3, 1950 |
| 2,528,147 | Jesonis | Oct. 31, 1950 |

FOREIGN PATENTS

| Number | Country | Date |
|---|---|---|
| 66,775 | France | Mar. 28, 1865 |
| 316,822 | Germany | Dec. 5, 1919 |